UNITED STATES PATENT OFFICE.

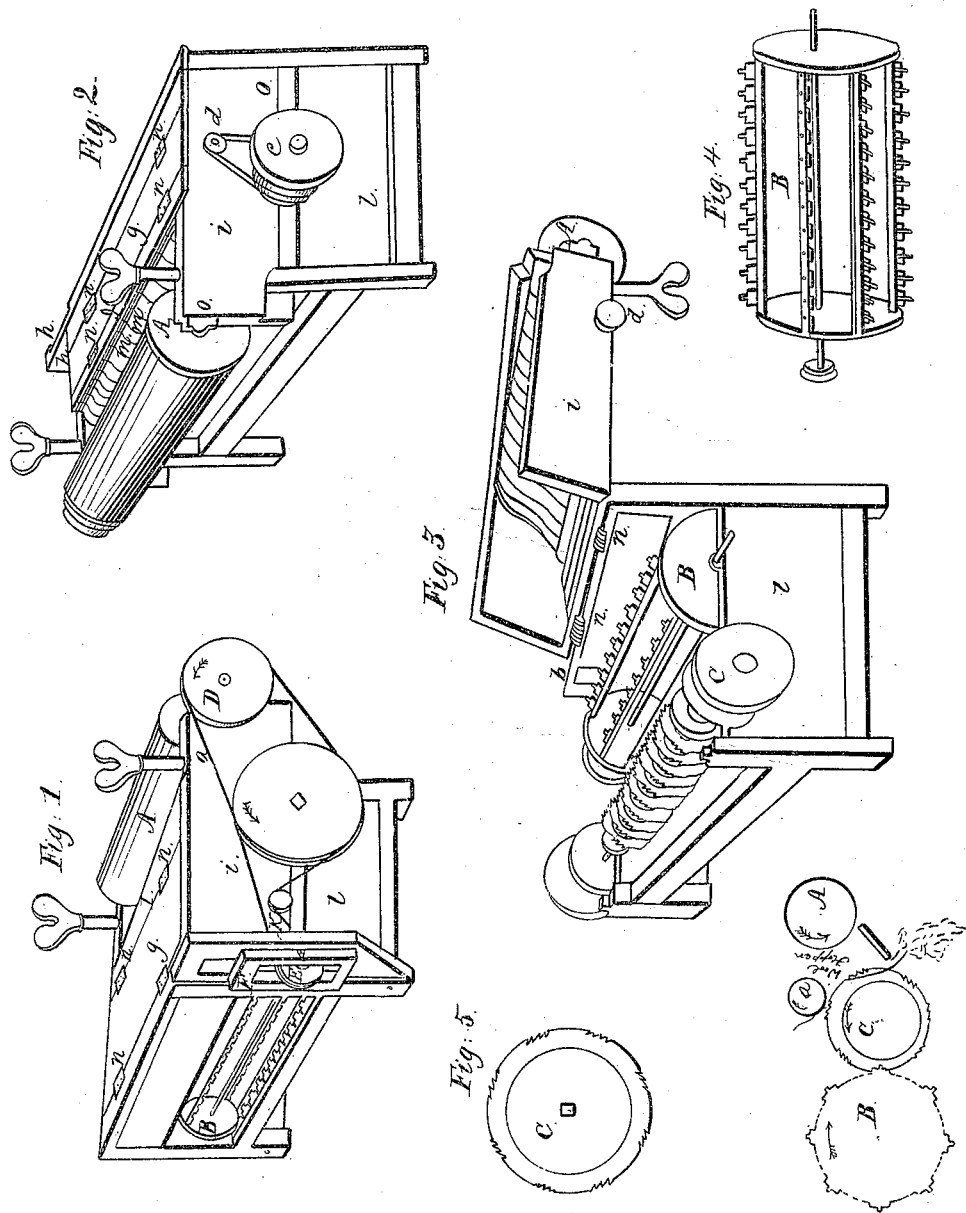

JOHN SHLY, OF RICHMOND COUNTY, GEORGIA.

MACHINE FOR PICKING OR BREAKING WOOL AND GINNED OR SEEDLESS COTTON.

Specification of Letters Patent No. 69, dated October 27, 1836.

*To all whom it may concern:*

Be it known that I, JOHN SHLY, of the county of Richmond and State of Georgia, have invented a new and useful improvement on saw cotton-gins and the application of said machine so improved to the new and useful purposes of picking and breaking of wool, also ginned or seedless cotton, and dislodging and clearing them from burs, briars, or any other substance which may prevent their being carded, dyed, or otherwise used to the same advantage as if run through this machine; also, for mixing of cotton, and wool together ready for the carding process.

I use the ordinary kind of frame, cylinders, and saws or cast steel circles, and brush wheel of a single breasted cotton gin now in common use in the Southern States for ginning of seeded cotton, and which is hereinafter represented and referred to in the annexed drawings in perspective from Figures 1 to 6, and which include my improvements on the same.

Fig. 1 represents the left hand end view, a back view, and a top view of said improved machine. A, is the drum forming the front part of the hopper, and which turns toward the saws, and causes the wool to roll back upon the saws. B, is the bush wheel, and which is one third larger in diameter than the saws, and which has from four to six ribs, or slats at equal distance apart around the bush heads, and which ribs have leather tacked on them about two inches wide; or bristles fastened into them opposite to each saw, and which are to work into the saws half an inch, so as to clear the teeth of the wool which they collect in passing through the roller, and then is drawn through the grating, and which throws the wool at the back of the machine. C, is the pulley, or whirr which is fixed on the end of the saw cylinder, and which has a groove turned in it to give motion to the drum A, and on the pulley C, is also a place left to turn the brush wheel B, by a leather band two inches broad, and which band passes over the pulley B, and to the sliding box, and pulley E, as represented in Fig. 1. The directions of the different pulleys are indicated by the dart thus —→. Pulley E, is intended as a tightening pulley to the band which turns the brush wheel B.

Fig. 2, represents the right hand end view; the front, and top views with the cylinder A, the hopper to hold the wool, and the breasting or grating, through which the saws pass carrying through the wool on the teeth, the grating keeping back the burs, and all other extraneous substances which should be taken out before the wool passes to the carding process, or is put to any other use. C, are the pulleys on the righ hand end of the saw cylinder, and which are two pulleys, or whirrs, the one next the frame is fastened on the square of the cylinder, and which turns the saws by a band three inches wide, the other is a loose or slack pulley on which the band is to be thrown when the machine is to stop. These pulleys should be about one-third larger in diameter than the saws are. On the first pulley there is a place turned to run a band an inch wide next to the frame, and which passes up to the pulley $a$, and turns the roller $d$, in front of the grating $m$, and near the top of the same, and which roller nearly touches the grating in front, and is intended to pull the wool back from the grating to prevent their being choked with the wool as the saws pass through between, and which roller $m$, also throws the wool back upon the saws to keep roll going, this roller $a$, is turned by an open band from pulley C, and gives pulley $a$ a contrary motion to that of the saws.

Fig. 3, represents a front, an end, and top view of the whole machine, with the top thrown back representing the saws, the cylinder, pullies or whirrs; the brush wheel, and bars or ribs on which the leather or bristles are attached with the pins which are made of either wood or iron, and which are to pass between the saws to prevent the wool from wrapping around the blocks which separate the saws from each other. These pins should pass within ¼ of an inch of the blocks so as to take off the wool at each revolution of the brush wheel. The grating is also represented as within the top when thrown back, and which when shut down comes between the saws, leaving just space enough between the grates for the saws to pass freely with their teeth full of wool.

Fig. 4 represents a front view of the brush wheel with the whirr, or pulley on it, also the ribs or bars passing from one to the other end of it, in which the pins, and leather or bristles are fixed, and which are used to clear the teeth on the saws, of the wool, by letting the leather or bristles run into the saws ⅜ of an inch so as to clear the teeth. This wheel should be at least ⅓ larger in diameter of its ends than the saws are, and should have three revolutions to one of the saws.

Fig. 5 represents a side view of my improved saw, the diameter of which may be from 9 to 15 inches made of sheet steel; they are made by making a square hole in them to suit the iron shaft which passes through them, and on which they are fixed by placing round blocks of wood or metal so as to keep the saws or circles one inch apart, and which blocks or circles should be two inches less in diameter than the saws; and which blocks are represented by the dark part of the circle C, by which means the grating is permitted to pass down between the saws, and yet not to touch these blocks or wooden circles. The saws are to have eight or ten teeth cut in the space of an inch on the circumference of the saws; then three inches on the circumference of the saw is to be left uncut, and so continued till the saw is cut around, by these means the few teeth will fill themselves, and break off the fiber of the wood by the time the next set of teeth take hold of the roll, and which spaces so left uncut will prevent the teeth from choking up the grating as it is apt to do if the teeth be continuously cut as in the common saw for ginning seeded cotton. The number of saws in a frame may vary from 15 to 50, according to the quantity which may be required to be picked in a day, and which varies (according to the diameter of the saws, and the number put in a frame) from 150 lbs. to 1000 lbs. per day, and even more than that number of pounds.

Fig. 6 represents an end view of the saw cylinder C, an end view of the brush wheel B, a side or end view of the grate m, also an end view of the drum A, which forms the front part of the hopper in which the wool, and other substances are to be placed, also an end view of a narrow plank which is fixed below the drum A, and near the bottom part of the grate m, so as to allow the burs, and other trash to fall down between the grate, and the edge of the board, also an end view of the roller d, all forming the hopper for the roll.

What I claim as my invention and desire to secure by Letters Patent is as follows:

1. My first improvement consists in cutting about eight or ten teeth in the space of an inch on the circumference of the saw, then leaving a space uncut of three inches, and so continued till cut around.

2. My second improvement consists in the roller d, placed near to the top of the grating, and in front of the same above where the saws pass through them, and which draws the wool loose from the top part of the same, and rolls it back upon the saws.

3. My third improvement consists in the small drum A, forming the front part of the hopper, and which rolls the wool onto the saws to keep it revolving, and which is peculiarly useful when wool is to be picked or broke a second time. The diameter of the drum A should be about the diameter of the saws or an inch or two longer.

4. My fourth improvement consists in placing the pins in the brush wheel ribs so as to pass between the saws, and extend near to the blocks which separate the saws from each other, and which pins prevent the wool from wrapping around said block so as to choke up with wool, and which without said pins will be apt to fill up with wool between the saws particularly when breaking long staple wool.

The manner of putting the foregoing described machine into practical operation is very simple. The main pulley that carries the saws, should have from 100 to 120 revolutions per minute, the wool, and other substances are fed into the hopper in such quantities as will just keep the hopper full, so as to form a roll about the diameter of the saws or some larger, when I mix wool, and cotton together or different colors of wool I take a handful of each alternately and throw into the hopper. When wool is to be picked and it is intended to be greased I usually take an oil pot, and form a stream of oil on the revolving roller or have a small tin tube placed near to the roller d, and in front of the same with small holes made in the bottom, that the oil may drop through upon the rolls.

The foregoing described machine will operate tolerably well with my first and second improvement, but will operate much better with all four of them.

The foregoing improvements, and their application to a new and useful purpose are submitted to the public with the hope that they may prove beneficial to us both, simple as they now appear when put into practical operation, yet they have cost me much labor, time, and thought for the last six years, and no small portion of my money.

JOHN SHLY.

Witnesses:
  GEO. RUDDELL,
  VAL. WALKER.